(12) United States Patent
Iwata et al.

(10) Patent No.: US 6,346,322 B1
(45) Date of Patent: Feb. 12, 2002

(54) MAGNETO-OPTICAL RECORDING MEDIUM AND REPRODUCING DEVICE

(75) Inventors: Noboru Iwata, Tenri; Junji Hirokane, Nara, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/455,635

(22) Filed: Dec. 7, 1999

(30) Foreign Application Priority Data

Dec. 8, 1998 (JP) ........................................... 10-348103

(51) Int. Cl.$^7$ ................................................. G11B 5/66
(52) U.S. Cl. ................ 428/332; 428/336; 428/694 ML; 428/694 MM; 428/694 EC; 428/900
(58) Field of Search .................. 428/694 ML, 634 MM, 428/634 EC, 332, 336, 900

(56) References Cited

U.S. PATENT DOCUMENTS 6,030,716 A * 2/2000 Izumi .................. 428/694 ML
B16,197,440 * 3/2001 Shiratori ............... 428/694 SC

OTHER PUBLICATIONS

"High–Density Magneto–Optical Recording With Domain Wall Displacement Detection", T. Shiratori, et al. Joint Magneto–Optical Recording International Symposium/International Symposium on Optical Memory 1997 Technical Digest, Tu–E–04, pp. 38–39.

* cited by examiner

*Primary Examiner*—Leszek Kiliman
(74) *Attorney, Agent, or Firm*—David G. Conlin; William J. Daley, Jr.; Dike, Bronstein, Roberts & Cushman Intellectual Property Practice Group

(57) ABSTRACT

A magneto-optical recording medium includes at least a first magnetic layer, a second magnetic layer, a third magnetic layer, a non-magnetic intermediate layer and a fourth magnetic layer which are layered in this order, the first magnetic layer being formed of a perpendicularly magnetized film having a relatively small wall coercivity and a relatively large wall mobility compared with the third magnetic layer in the vicinity of a predetermined temperature, the second magnetic layer being formed of a magnetic film whose Curie temperature is lower than the Curie temperatures of the first magnetic layer and third magnetic layer, the fourth magnetic layer being a perpendicularly magnetized film with a uniform magnetization direction and forming a region having a uniform magnetization direction in the first magnetic layer by magnetostatic coupling with the first magnetic layer when the second magnetic layer is heated to a predetermined temperature or a higher temperature.

21 Claims, 12 Drawing Sheets

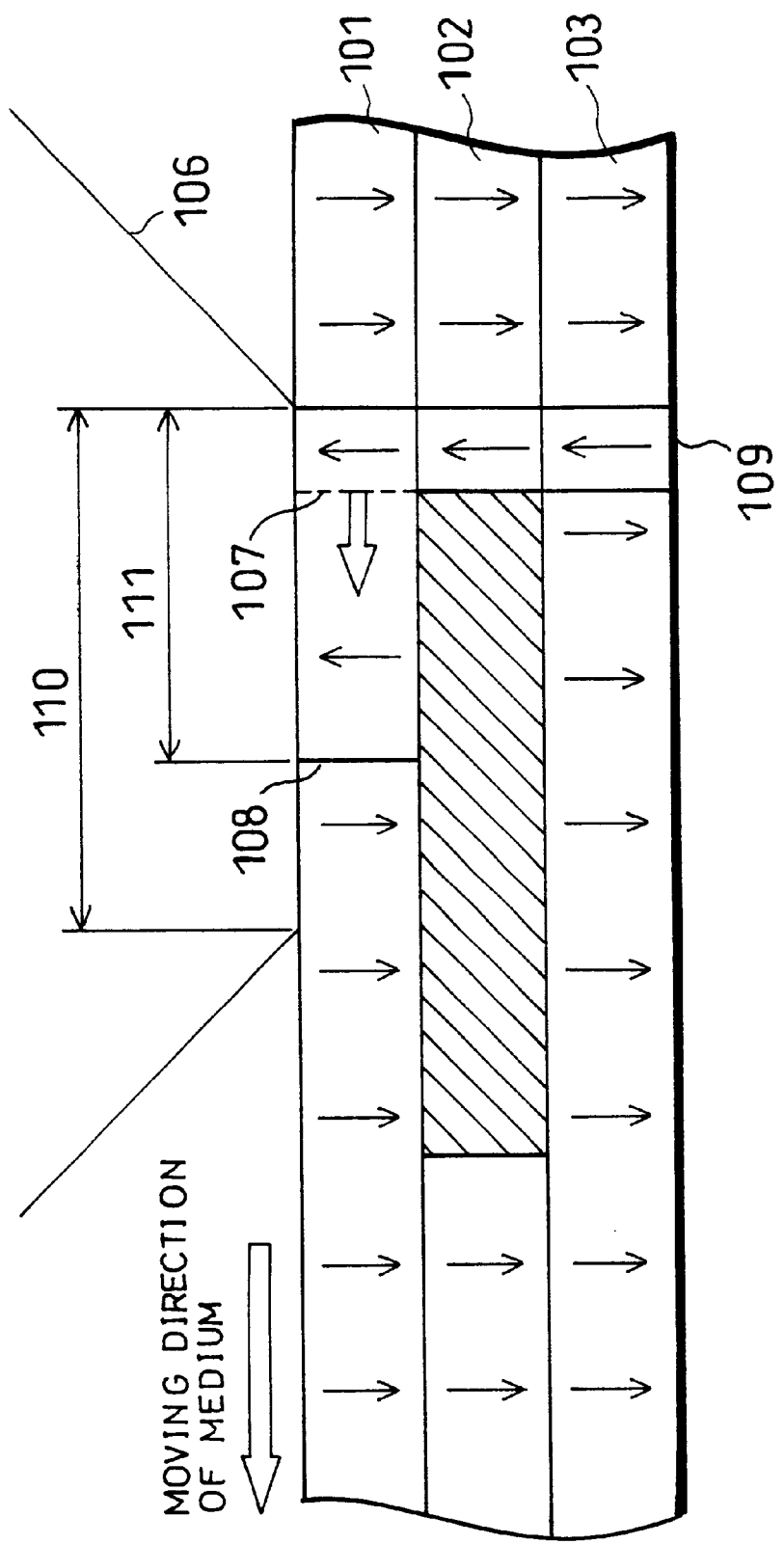

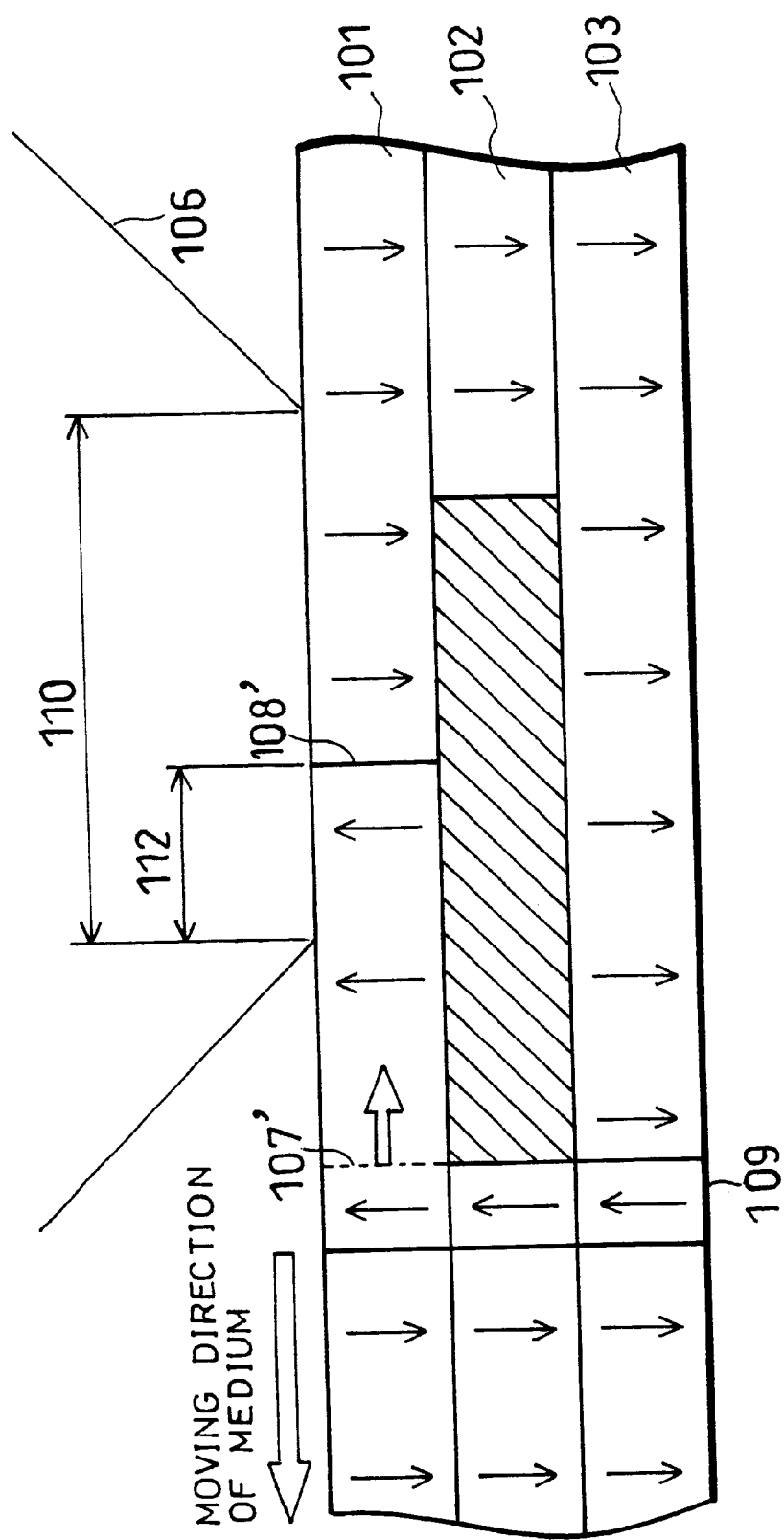

MAGNETO-OPTICAL RECORDING MEDIUM AND REPRODUCING DEVICE

FIELD OF THE INVENTION

The present invention relates to magneto-optical recording media, such as magneto-optical disks, magneto-optical tapes and magneto-optical cards, and a reproducing device for reproducing information on such a magneto-optical recording medium.

BACKGROUND OF THE INVENTION

A magneto-optical recording medium has been practically used as a rewritable optical recording medium. Information is recorded on and reproduced from a magneto-optical recording medium with a converged light beam emitted from a semiconductor laser. However, the magneto-optical recording medium has such a drawback that the reproduction properties deteriorate when the diameter of a recording bit as a recording-use domain and the interval of the recording bits become smaller with respect to the diameter of the light beam.

When the diameter of the recording bit and the interval of the recording bits become smaller with respect to the diameter of the light beam, a recording bit adjacent to a target recording bit enters into the diameter of the light beam converged on the target recording bit. As a result, individual recording bits can not be read out separately and the reproduction properties deteriorate.

A structure for solving the above drawback of the magneto-optical recording medium is proposed in "High-Density Magneto-Optical Recording with Domain Wall Displacement Detection" (Joint Magneto-Optical Recording International Symposium/International Symposium on Optical Memory 1997 Technical Digest, Tu-E-04, p. 38,39). In this magneto-optical recording medium, the first, second and third magnetic layers are layered in this order. The first magnetic layer is made of a perpendicularly magnetized film having a relatively small wall coercivity and a relatively large wall mobility compared with those of the third magnetic layer in the vicinity of a readout temperature. The Curie temperature of the second magnetic layer is set lower than the Curie temperatures of the first and third magnetic layers. According to this structure, even when the recording bit diameter and the recording bit interval are small, individual recording bits can be read out separately without lowering the readout signal level, by moving the domain wall into a region where the temperature has risen by the irradiation of a light beam.

A method of reproducing information on the magneto-optical recording medium with the above-described structure will be explained with reference to FIG. 10. A first magnetic layer 101, a second magnetic layer 102 and a third magnetic layer 103 are layered in an exchange coupled state. Denoting the Curie temperatures of the first, second and third magnetic layers in the laminated state by Tc101, Tc102 and Tc103, respectively, Tc101 and Tc102 satisfy the relationship Tc102<Tc101. In FIG. 10, the arrows show the direction of transition metal magnetic moments of the respective magnetic layers. Here, magnetic domains have already been recorded in the third magnetic layer 103, and an upwardly oriented magnetic domain and a downwardly oriented magnetic domain are present alternately in a repeated manner.

When a reproduction-use light beam 106 is irradiated and converged on such a magneto-optical recording medium from the first magnetic layer 101 side, the second magnetic layer 102 has a region heated to a temperature equal to or higher than its Curie temperature. In a region having a temperature lower than the Curie temperature, the magnetic domain information in the third magnetic layer 103 is copied to the first magnetic layer 101 through the second magnetic layer 102 by the exchange coupling. In other words, the upward transition metal magnetic moment at the front part of a region 110 irradiated with the light beam is copied as it is from the third magnetic layer 103 to the first magnetic layer 101.

On the other hand, in the region heated to a temperature equal to or higher than the Curie temperature of the second magnetic layer 102 (the region located behind a light beam 106 by a movement of the medium such as a rotation of a disk substrate), since the exchange coupling between the first magnetic layer 101 and third magnetic layer 103 is cut off by the second magnetic layer 102, the domain wall in the first magnetic layer 101 is readily movable.

When the information in the third magnetic layer 103 is copied as it is to the first magnetic layer 101, a domain wall 107 is essentially formed. However, in a region where the second magnetic layer 102 has been heated to a temperature equal to or higher than its Curie temperature, since the domain wall in the first magnetic layer 101 is readily movable, the domain wall 107 moves to the most stable location. Here, considering a fact that the domain wall energy density decreases with an increase in temperature, the domain wall 107 moves to a location where the temperature is increased most by the irradiation of the light beam 106, and forms a domain wall 108.

Thus, in the magneto-optical recording medium of the above-described structure, since the domain wall can be moved by the characteristic of the second magnetic layer 102, the recording domain of the third magnetic layer 103 can be enlarged in the first magnetic layer 101. Therefore, even when the recording domain is reduced, it is possible to increase the amplitude of the readout signal from the first magnetic layer 101, thereby allowing readout of signals of a cycle less than the diffraction limit of light.

However, in the above-mentioned reproduction method, there are two types of domain movements, i.e., a domain movement from the front part and a domain movement from the rear part. Hence, there is a problem that a single domain is read out twice. Referring now to FIGS. 11 and 12, the following description will explain this point.

FIG. 11 shows a state in which an independent magnetic domain 109 formed in the third magnetic layer 103 is present at the front part of the light beam 106, the third magnetic layer 103 and first magnetic layer 101 are exchange coupled at the position of the independent magnetic domain 109, and the upward moment is copied to the first magnetic layer 101. In FIG. 11, the shaded portion of the second magnetic layer 102 is a region X where the second magnetic layer 102 is heated to its Curie temperature or a higher temperature.

In the state shown in FIG. 11, the domain wall 107 moves to the position of the domain wall 108 to enlarge the magnetic domain, and a readout magnetic domain 111 with an upward moment is formed in the region 110 irradiated with the light beam 106. Therefore, a large readout signal amplitude is obtained. When the medium (magneto-optical recording medium) is moved relatively to the light beam 106 from the state shown in FIG. 11, a downward moment of the third magnetic layer 103 is copied to the first magnetic layer 101 upon passage of the independent magnetic domain 109 through the region X, and the moment in the readout magnetic domain 111 is also oriented downward.

Further, when the medium is moved into a state shown in FIG. 12, i.e., the independent magnetic domain 109 is located at the rear end of the region X of the second magnetic layer 102, the upward moment of the independent magnetic domain 109 in the third magnetic layer 103 is copied to the first magnetic layer 101, and a domain wall 107' moves to the position of a most stable domain wall 108'. Thus, a readout magnetic domain 112 with an upward moment exists in the region 110 irradiated with the light beam 106.

As described above, the independent magnetic domain 109 is read out once when it is located at the front end of the region X where the second magnetic layer 102 is heated to its Curie temperature or above by the irradiation of the light beam (in the state shown in FIG. 11), and read out again when it is located at the rear end of the region X (in the state shown in FIG. 12). This phenomenon is noticeable in a relatively long recording magnetic domain where the exchange coupling between the third magnetic layer 103 and first magnetic layer 101 is stable as disclosed in "High-Density Magneto-Optical Recording with Domain Wall Displacement Detection" (Joint Magneto-Optical Recording International Symposium/International Symposium on Optical Memory 1997 Technical Digest, Tu-E-04, p. 38,39).

Thus, with a conventional magneto-optical recording medium, since a relatively long recording magnetic domain can not be read out in a stable manner, a serious problem will occur when performing recording and reproduction by a mark edge recording method in which information is recorded at a higher density.

SUMMARY OF THE INVENTION

An object of the present invention is to provide a magneto-optical recording medium which enables readout of signals of a cycle equal to or less than a diffraction limit of light without lowering the amplitude of the readout signals and does not cause repetitious readout even in a long recording magnetic domain.

In order to achieve the above object, a magneto-optical recording medium of the present invention includes at least a first magnetic layer, a second magnetic layer, a third magnetic layer, a non-magnetic intermediate layer and a fourth magnetic layer which are layered in this order, and is characterized in that the first magnetic layer is formed of a perpendicularly magnetized film with a relatively small wall coercivity and a relatively large wall mobility compared with the third magnetic layer in the vicinity of a predetermined temperature, the second magnetic layer is formed of a magnetic film whose Curie temperature is lower than those of the first and third magnetic layers, and the fourth magnetic layer is a perpendicularly magnetized film which has a uniform magnetization direction and forms a region with a uniform magnetization direction in the first magnetic layer by magnetostatic coupling with the first magnetic layer when the second magnetic layer is heated to a predetermined temperature or a higher temperature.

According to this structure, during reproduction, a region with a uniform magnetization direction can be formed in the first magnetic layer by magnetostatic coupling with the fourth magnetic layer, and a movement of the domain wall from the rear end of the light beam can be limited by the region with the uniform magnetization direction.

Therefore, even when a recording magnetic domain is long, it can be readout accurately. Thus, this structure can cope with high-density mark edge recording.

Consequently, magnetic domain enlargement readout is realized without causing repetitious readout, and signals of a cycle less than the diffraction limit of light can be read out without lowering the amplitude of the readout signals, thereby significantly improving the recording density.

Moreover, in order to reproduce information on the above-mentioned magneto-optical recording medium, a reproducing device of the present invention is characterized in including:

irradiating means for irradiating a light beam on the magneto-optical recording medium during reproduction; and control means for controlling the irradiation intensity of the light beam to an intensity capable of heating the magneto-optical recording medium to a temperature at which magnetostatic coupling between the fourth magnetic layer and the first magnetic layer occurs, or a higher temperature.

In other words, the reproducing device of the present invention is designed to heat the magneto-optical recording medium to a predetermined temperature (readout temperature) or a higher temperature by the irradiation of the light beam by the irradiating means, and to control the light beam which is controlled to an intensity capable of generating a leakage magnetic field sufficient for achieving magnetostatic coupling between the fourth magnetic layer and the first magnetic layer to irradiate the magneto-optical recording medium by the control means. Thus, with the use of this reproducing device, the information on the magneto-optical recording medium including the fourth magnetic layer can be satisfactorily reproduced.

For a fuller understanding of the nature and advantages of the invention, reference should be made to the ensuing detailed description taken in conjunction with the companying drawings.

BRIEF DESCRIPTION OF THE DRAWINGS

FIG. 11 is a depictive cross section explaining the principle of reproducing information on the conventional magneto-optical disk.

FIG. 12 is a depictive cross section explaining the principle of reproducing information on the conventional magneto-optical disk.

DESCRIPTION OF THE PREFERRED EMBODIMENT

Figure 1:
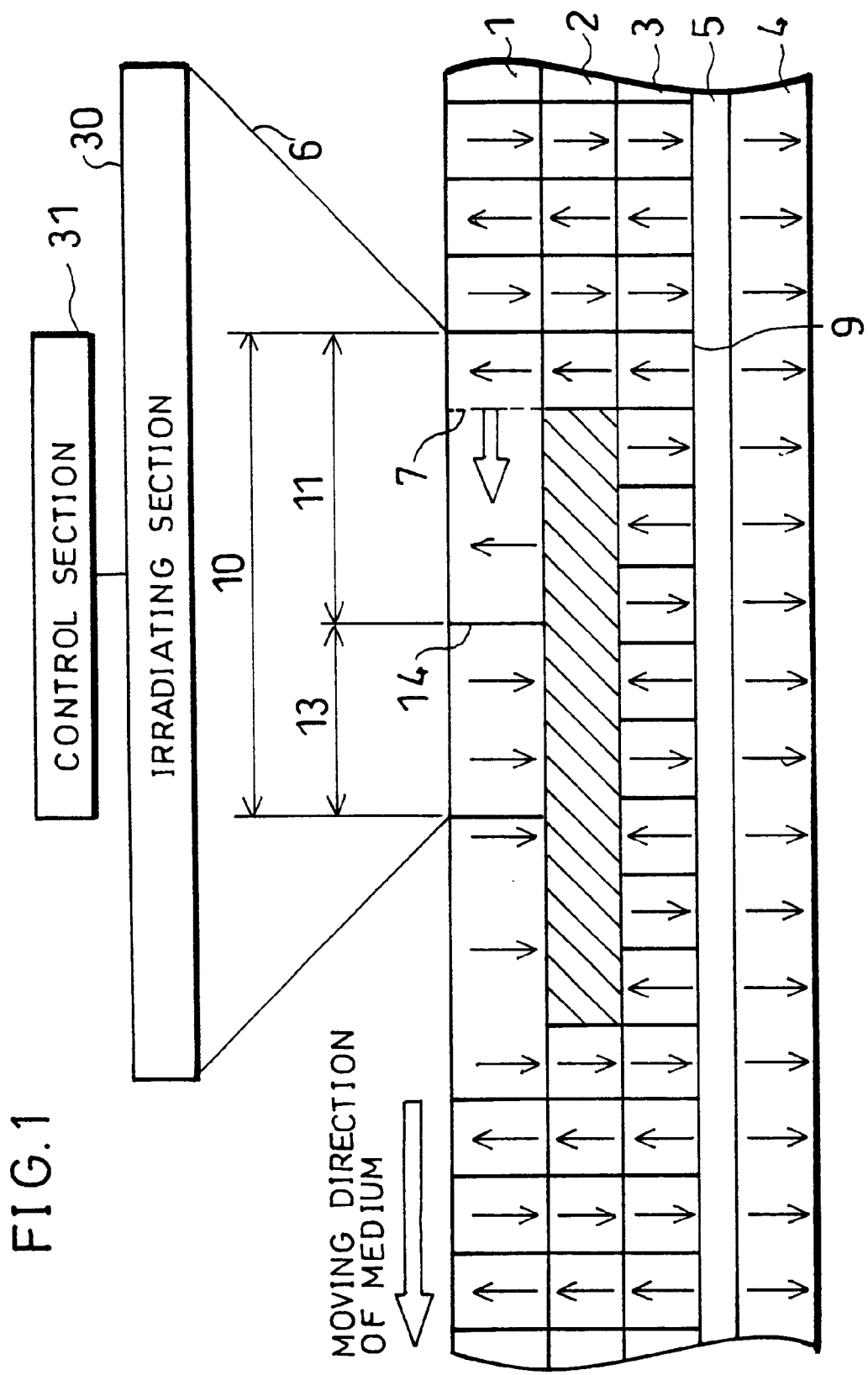
FIG. 1 is an explanatory view explaining the principle of reproducing a magneto-optical disk of the present invention.

Referring to the drawings, an embodiment of the present invention will be described below.

In the following description, a magneto-optical recording medium of the present invention is explained. First, the principle of the magneto-optical recording medium of the present invention will be explained.

FIG. 1 is a cross section showing a state of reproducing information from the magneto-optical recording medium of the present invention. The magneto-optical recording medium of the present invention includes a first magnetic layer (readout layer) 1, a second magnetic layer 2, a third magnetic layer (recording layer), a non-magnetic intermediate layer 5, and a fourth magnetic layer (magnetic field generating layer) 4, which are layered in this order. The first magnetic layer 1 is formed of a perpendicularly magnetized film having relatively small wall coercivity and relatively large wall mobility compared with the third magnetic layer 3 in the vicinity of a readout temperature. The second magnetic layer 2 is formed of a magnetic film whose Curie temperature is lower than the Curie temperatures of the first magnetic layer 1 and third magnetic layer 3. The magnetic properties of the first magnetic layer 1 and third magnetic layer 3 are set so that a leakage magnetic field generated at a temperature equal to or higher than the Curie temperature of the second magnetic layer 2 is smaller, thereby permitting a smooth domain movement in the first magnetic layer 1. The fourth magnetic layer 4 is formed of a perpendicularly magnetized film with a uniform magnetization direction. The magnetic property of the fourth magnetic layer 4 is set so that a leakage magnetic field is generated in a high-temperature area (an area with a temperature higher than at least the Curie temperature of the second magnetic layer 2) of a region irradiated with a light beam 6 during reproduction, and the fourth magnetic layer 4 is magnetostatically coupled with the first magnetic layer 1.

On such a magneto-optical recording medium, information is recorded as upward and downward magnetic moments in the third magnetic layer 3. Meanwhile, a readout operation is performed as follows.

At room temperature, the first magnetic layer 1, second magnetic layer 2 and third magnetic layer 3 are exchange-coupled, and the information recorded in the third magnetic layer 3 is copied to the first magnetic layer 1 through the second magnetic layer 2.

During reproduction, a region heated to a temperature equal to or higher than the Curie temperature is formed in the second magnetic layer 2 by irradiating the light beam 6 from the first magnetic layer 1 side by an irradiating section 30 of a reproducing device. At this time, in the heated region, since the magnetization of the second magnetic layer 2 disappears, the exchange coupling is cut off, and the domain wall positioned in the heated region of the first magnetic layer 1 is readily movable. Therefore, in the region where the second magnetic layer 2 is heated to a temperature equal to or higher than the Curie temperature, a domain wall 7 moves backward, thereby forming a large magnetic domain.

According to a conventional structure, when reproducing information from a relatively long recording magnetic domain, a movement of a domain wall from the rear end of the light beam 6 irradiated on the first magnetic layer 1 will also occur, causing a problem that a single magnetic domain is read out repetitiously as mentioned above.

Hence, the magneto-optical recording medium of the present invention further includes the fourth magnetic layer 4 which is formed of a perpendicularly magnetized film with a uniform magnetization direction and generates a leakage magnetic field as the temperature rises. When reproducing information recorded on the magneto-optical recording medium, by heating the magneto-optical recording medium to a predetermined temperature (readout temperature) or a higher temperature by irradiating the light beam emitted from the irradiating section 30 of the reproducing device, the light beam which is controlled to have an intensity capable of generating a leakage magnetic field sufficient for achieving magnetostatic coupling between the fourth magnetic layer 4 and the first magnetic layer 1 is irradiated on the magneto-optical recording medium. The control of the intensity of the light beam is executed by a control section 30 of the reproducing device.

As a result, a region 13 having a uniform magnetization direction can be formed in the first magnetic layer 1 by the magnetostatic coupling with the fourth magnetic layer 4, and the movement of a domain wall from 7 the rear end of the light beam 6 can be limited by the region 13.

Figure 2:
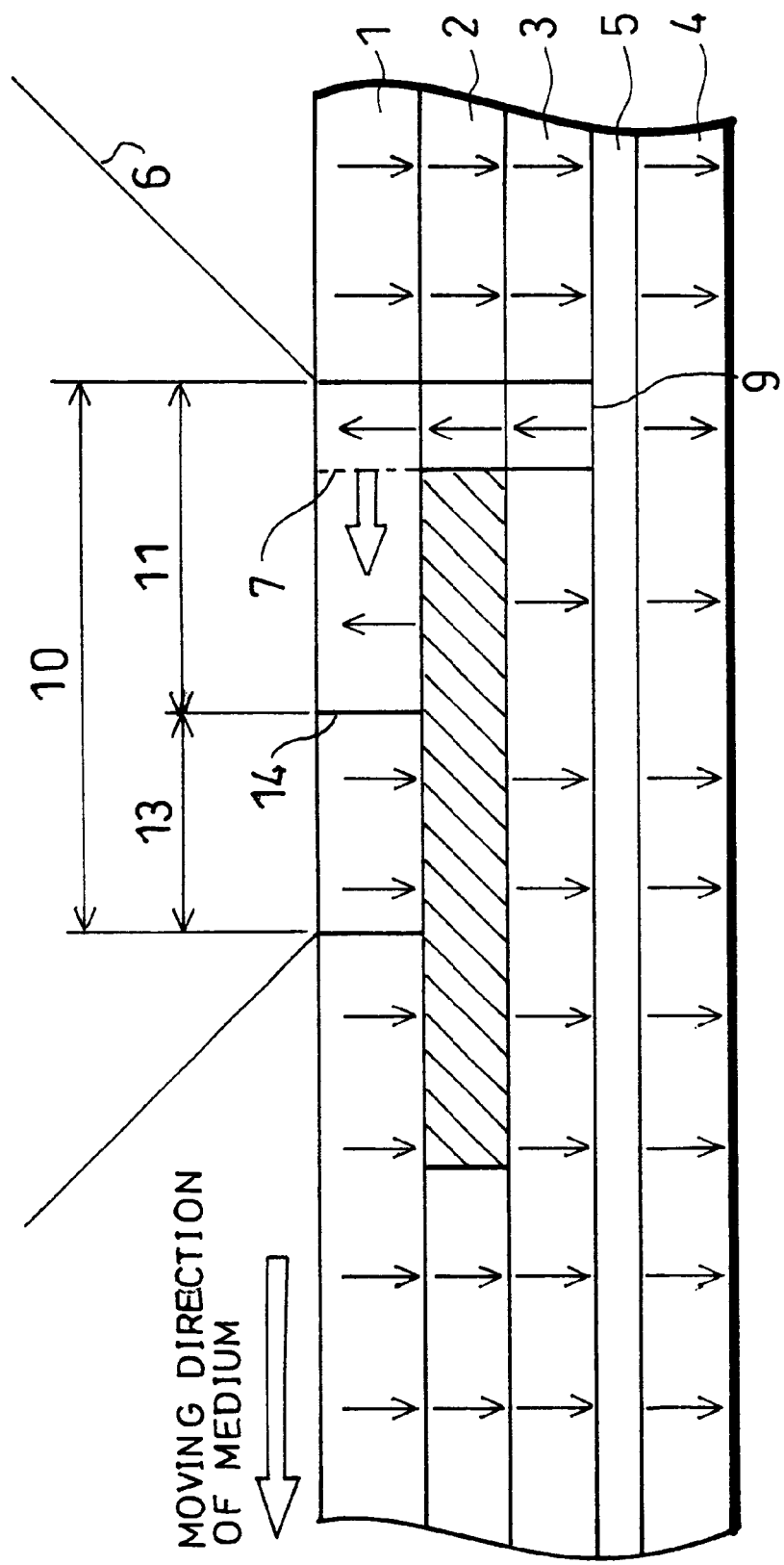
FIG. 2 is a depictive cross section explaining the principle of reproducing information on the magneto-optical disk of the present invention.
Figure 3:
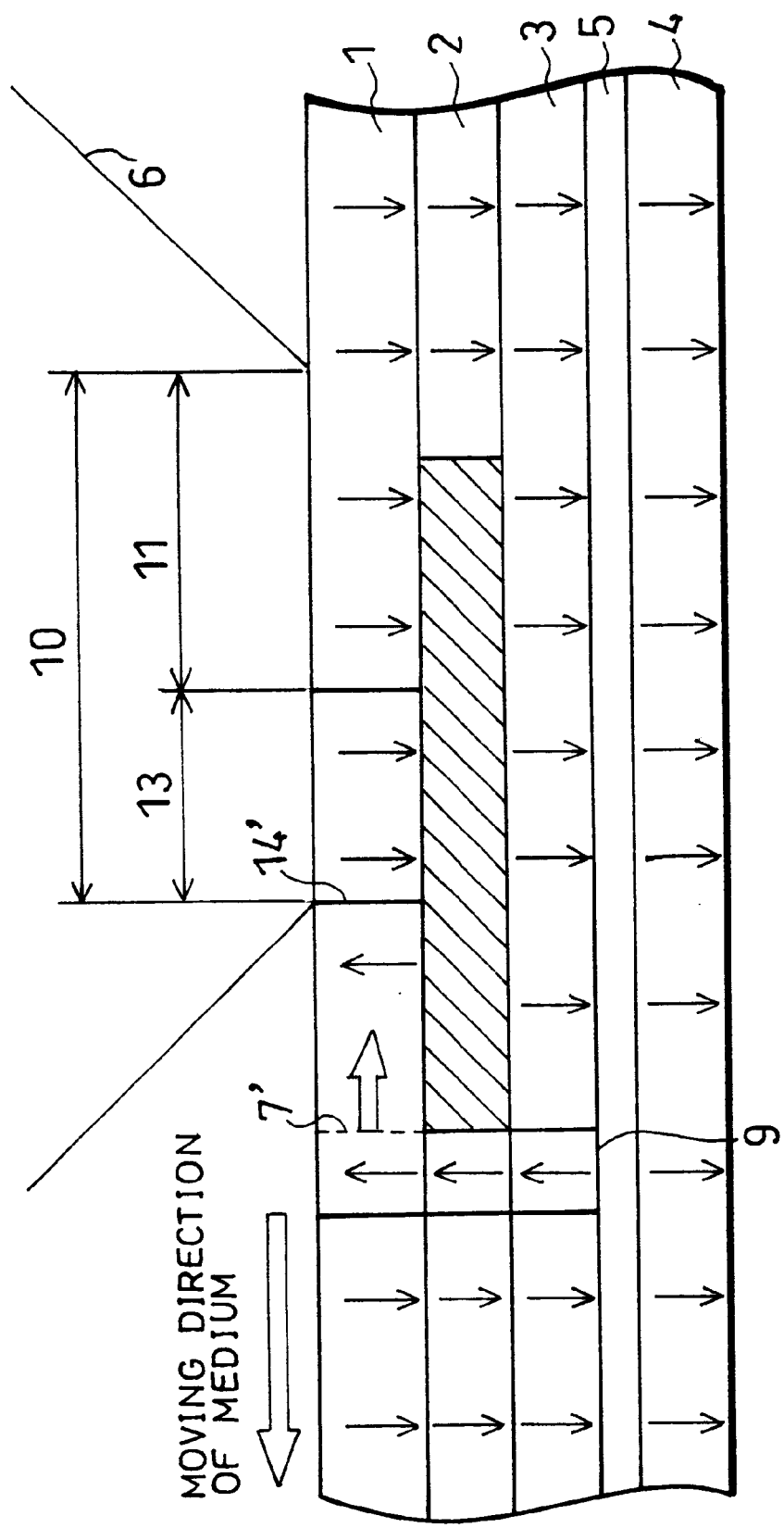
FIG. 3 is a depictive cross section explaining the principle of reproducing information on the magneto-optical disk of the present invention.

Like FIGS. 11 and 12 used for explaining a prior art, FIGS. 2 and 3 are depictive cross sections explaining a state of displacement of an isolated magnetic domain 9 caused by a movement of the medium.

As illustrated in FIG. 2, when the isolated magnetic domain 9 is located at the front end of the light beam 6, like FIG. 11, the domain wall 7 is moved to an edge 14 of the region 13 with a uniform magnetization direction, thereby realizing domain enlargement readout. On the other hand, as shown in FIG. 3, when the isolated magnetic domain 9 is located at a rear part, like FIG. 11, a domain wall 7' is moved to an edge 14' of the region 13 having a uniform magnetization direction. Here, since a magnetic domain enlarged at this rear part is present outside of a region 10 irradiated with the light beam 6, the information can never be reproduced from this part by the irradiation of the light beam 6. It is thus possible to achieve domain enlargement readout only from the front part, without causing repetitious readout as explained with reference to FIGS. 11 and 12.

Consequently, a long recording magnetic domain can be read out accurately, and high-density mark edge recording can also be performed.

The following description will explain some examples of magneto-optical disks as the magneto-optical recording medium of the present invention.

Figure 4:
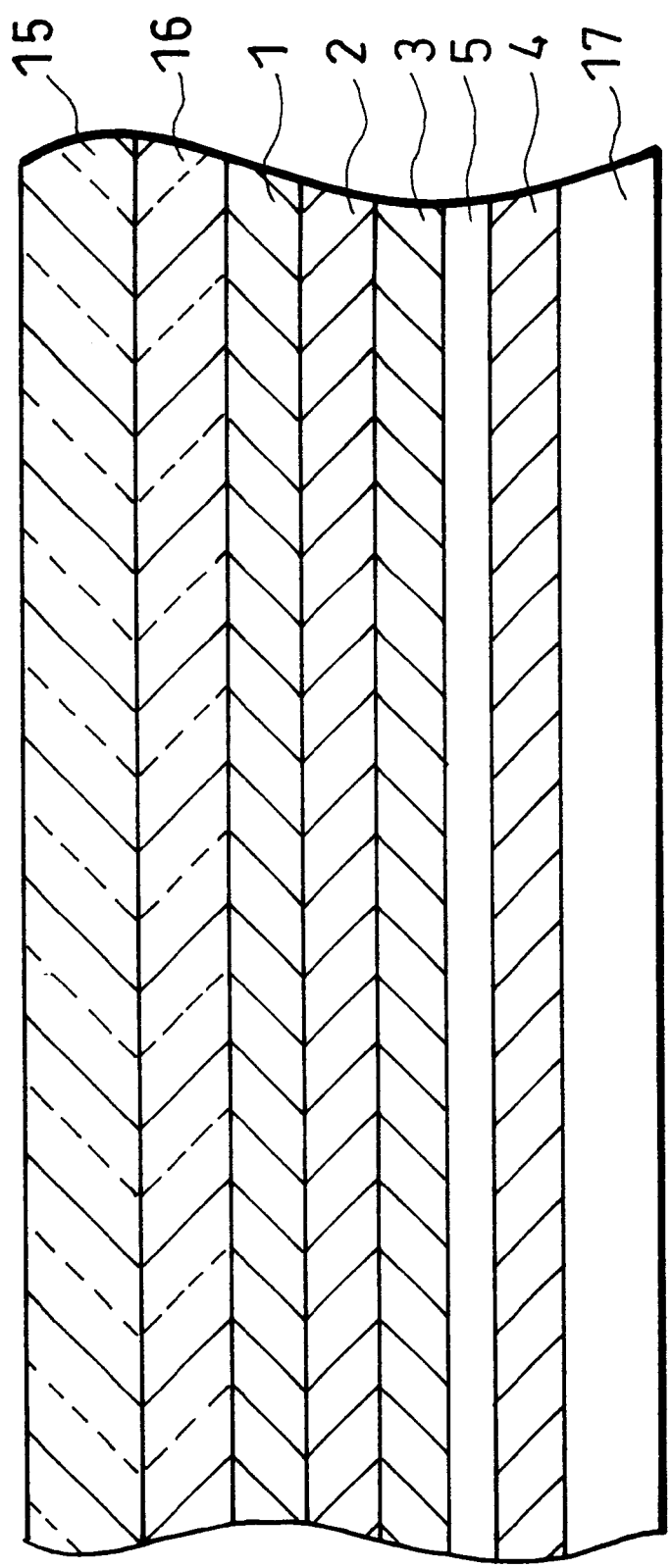
FIG. 4 is a cross section showing the structure of the magneto-optical disk of the present invention.

As illustrated in FIG. 4, a magneto-optical recording medium of this embodiment includes a transparent dielectric protective layer 16, a first magnetic layer 1, a second magnetic layer 2, a third magnetic layer 3, a non-magnetic intermediate layer 5, a fourth magnetic layer 4 and a protective film 17, which are layered in this order on a magneto-optical disk substrate 15.

Such a magneto-optical disk employs a Curie temperature recording method as the recording method, and performs recording by controlling the magnetization direction in the third magnetic layer 3 by converging the light beam 6 emitted from a semiconductor laser on the first magnetic layer 1 through the optical disk substrate 15 and transparent dielectric protective layer 16 so as to heat the third magnetic layer 3 to a temperature equal to or higher than the Curie temperature and by applying an external magnetic field. During reproduction, the light beam 6 is set to a power weaker than that in recording, and the information is reproduced by a magneto-optical effect known as the polar Kerr effect. The polar Kerr effect is a phenomenon in which the direction of a rotation of the polarized plane of reflected light is reversed by the direction of magnetization perpendicular to the light incident surface.

Figure 5:
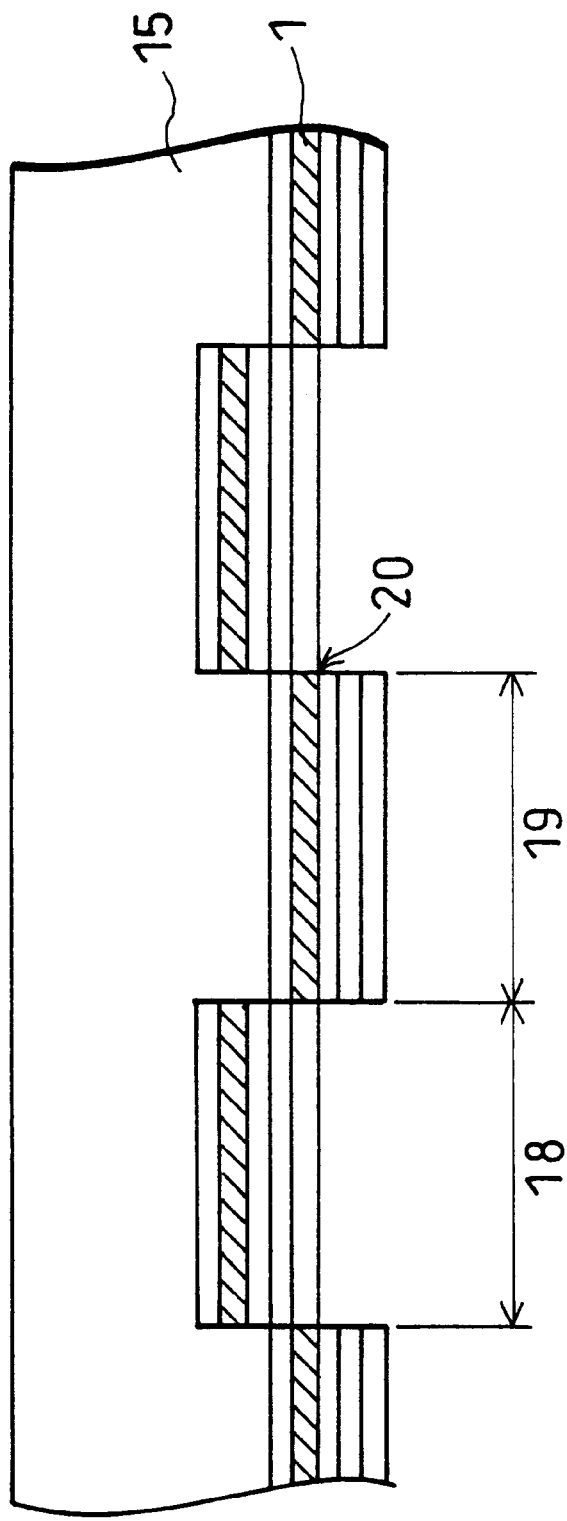
FIG. 5 is an explanatory view showing the structure of the magneto-optical disk of the present invention.

The magneto-optical disk substrate 15 is formed of a transparent base material, for example, polycarbonate, in the shape of a disk, and has guide grooves 18 for guiding the light beam 6 on a film formed surface (see FIG. 5). According to the present invention, information can be recorded on either of lands 19 and the grooves 18, or both of the lands 19 and grooves 18. The depth of the groove 18 is preferably at least two times the thickness of the first magnetic layer 1.

FIG. 5 is a cross section of the magneto-optical recording medium having the guide grooves 18 on the optical disk substrate 15. The guide groove 18 has a rectangular cross section with a depth of 100 nm, which is more than two times the film thickness, 40 nm, of the first magnetic layer 1. Therefore, the first magnetic layers 1 layered on the lands 19 are substantially separated by a gap 20 between the guide groove 18 and the land 19. In actual fact, since the first magnetic layers 1 are formed by sputtering, a magnetic film is also formed at the gap 20 and connects the first magnetic layers 1. However, since the film is extremely thin, the magnetic coupling at the gap 20 can be ignored.

Figure 6:
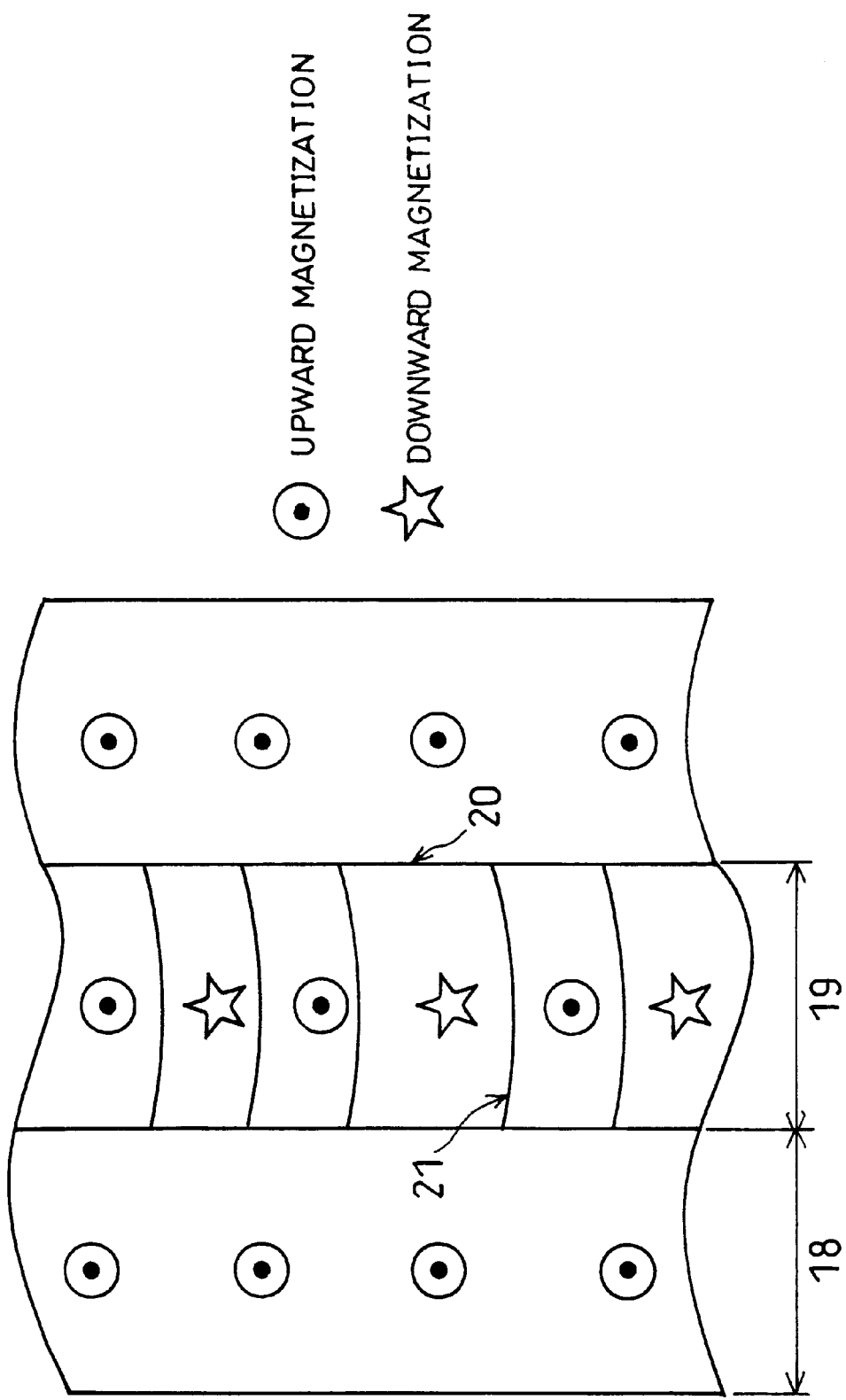
FIG. 6 is an explanatory view explaining a domain wall of the magneto-optical disk of the present invention.

In the present invention, information tracks being magnetically separated from each other are in such a state. When a switched magnetic domain is formed over the entire width of the land 19, as shown in FIG. 6, a domain wall is not formed at a boundary section between adjacent magnetic domains at the gap 20, but an unclosed domain wall 21 is formed at the boundary section between adjacent magnetic domains on the land 19. Even if such an unclosed domain wall 21 is moved in a track direction, it does not cause generation or elimination of a domain wall at the gap 20. Thus, the domain wall 21 can be moved easily.

For the transparent dielectric protective layer 16, it is preferred to use a transparent dielectric such as AlN, SiN, AlSiN, and $Ta_2O_3$. The film thickness of the transparent dielectric protective layer 16 needs to be set so that a satisfactory interference effect is realized with respect to the incident light beam 6 and the polar Kerr rotation angle of the medium is increased. More specifically, the film thickness of the transparent dielectric protective layer 16 is set to around ($\lambda/(4n)$) where $\lambda$ is the wavelength of the light beam 6 and n is the refractive index of the transparent dielectric protective layer 16. For instance, when the wavelength of the light beam 6 is 680 nm, the transparent protective layer 16 can have a film thickness ranging from about 40 nm to about 100 nm.

The Curie temperature Tc1 of the first magnetic layer 1 is preferably no lower than 140° C.

When Tc1<140° C., a decrease of the Kerr rotation angle due to a lowering of the Curie temperature of the first magnetic layer 1 is noticeable, and the intensity of the readout signal is lowered. Consequently, satisfactory reproduction properties can not be obtained.

Moreover, the film thickness of the first magnetic layer 1 is preferably in a range of from 20 nm to 80 nm. If the film thickness of the first magnetic layer 1 is less than 20 nm, a satisfactory masking effect is not obtained due to an increase in the amount of light transmitted therethrough, and the intensity of the readout signal is lowered, causing deterioration of the reproduction properties. On the other hand, if the film thickness of the first magnetic layer 1 is more than 80 nm, deterioration of the recording sensitivity due to the increase in the film thickness is noticeable.

As the first magnetic layer 1 satisfying the above magnetic properties, it is possible to use a perpendicularly magnetized film made of material such as GdFe, GdFeD or GdFeCoD (D is an element selected from Y, Ti, V, Cr, Pd, Cu, Si and Al, or two or more kinds of these elements); GdHRFe, GdHRFeCo or GdHRFeCoD (HR is a heavy rare earth metal and an element selected from Tb, Dy, Ho and Er, or two or more kinds of these elements, and D is an element selected from Y, Ti, V, Cr, Pd, Cu, Si and Al, or two or more kinds of these elements); and GdLRFe, GdLRFeCo or GdLRFeCoD (LR is a light rare earth metal and an element selected from Ce, Pr, Nd and Sm, or two or more kinds of these elements, and D is an element selected from Y, Ti, V, Cr, Pd, Cu, Si and Al, or two or more kinds of these elements).

The second magnetic layer 2 is formed of a magnetic film made of a rare earth and transition metal alloy, and has a Curie temperature lower than the Curie temperatures of the first magnetic layer 1 and third magnetic layer 3. The Curie temperature Tc2 of the second magnetic layer 2 is preferably within a range of from 40° C. to 220° C. When Tc2<40° C., since the Curie temperature of the second magnetic layer 2 is too low, it is difficult to stably maintain the exchange coupling between the first magnetic layer 1 and third magnetic layer 3 in an area where the temperature is not increased, resulting in deterioration of the quality of the readout signal. On the other hand, when Tc2>220° C., since the first magnetic layer 1 and third magnetic layer 3 are exchange coupled even in a high-temperature region, a region permitting an enlargement of the magnetic domain becomes narrower, the intensity of the readout signal is lowered, and the signal quality is deteriorated.

Moreover, the film thickness of the second magnetic layer 2 is preferably in a range of from 2 nm to 80 nm. If the film thickness of the second magnetic layer 2 is less than 2 nm, the exchange coupling between the first magnetic layer 1 and third magnetic layer 3 can not be cut off in an area where the second magnetic layer 2 is heated to the Curie temperature or a higher temperature. Therefore, the movement of the domain wall in the first magnetic layer 1 is interfered, and it is difficult to achieve magnetic domain enlargement readout in a stable manner. On the other hand, if the film thickness of the second magnetic layer 2 is more than 80 nm, deterioration of the recording sensitivity due to the increase in the film thickness is noticeable.

As the second magnetic layer 2 satisfying the above magnetic properties, it is possible to use a perpendicularly magnetized film made of material such as TbFe, TbFeCo, DyFe, DyFeCo, TbDyFeCo, TbFeD, TbFeCoD, DyFeD, DyFeCoD, TbDyFeD, and TbDyFeCoD (D is an element selected from Y, Ti, V, Cr, Pd, Cu, Si and Al, or two or more kinds of these elements).

The third magnetic 3 layer is formed of a perpendicularly magnetized film made of a rare earth and transition metal alloy, and has a Curie temperature higher than the Curie temperature of the second magnetic layer 2. The Curie temperature Tc3 of the third magnetic layer 3 is preferably within a range of from 180° C. to 300° C. When Tc3<180 C., since the Curie temperature of the third magnetic layer 3 is too low, the medium is heated to the Curie temperature of the third magnetic layer 3 or a higher temperature with a slight increase of temperature during reproduction, and the recorded information is erased. Thus, the power margin is excessively narrow. On the other hand, when Tc3>300° C., it is necessary to heat the third magnetic layer 3 to 300° C. or a higher temperature to perform recording, and the recording sensitivity deteriorates noticeably. Additionally, since the first magnetic layer 1, second magnetic layer 2 and third magnetic layer 3 are heated to 300° C. or a higher temperature, the magnetic properties of the respective layers deteriorate, and the quality of the readout signal is deteriorated by the erasure of recording.

Besides, it is necessary to set the magnetic properties of the third magnetic layer 3 so that a leakage magnetic field generated from the third magnetic layer 3 in a high-temperature region where the fourth magnetic layer 4 is magneto-statically coupled with the first magnetic layer 1 is so small that the leakage magnetic field does not interfere with the magnetostatic coupling between the fourth magnetic layer 4 and first magnetic layer 1. In this high-temperature region, if the leakage magnetic field from the third magnetic layer 3 is large, the magnetostatic coupling between the fourth magnetic layer 4 and first magnetic layer 1 is unstable, and the movement of the domain wall from the rear end of the light beam 6 can not be limited sufficiently.

Moreover, the film thickness of the third magnetic layer 3 is preferably set within a range of from 5 nm to 80 nm. If the film thickness of the third magnetic layer 3 is less than 5 nm, it is difficult to perform stable recording and the quality of the readout signal is deteriorated by an increase of recording noise. On the other hand, if the film thickness of the third magnetic layer 3 is more than 80 nm, deterioration of the recording sensitivity due to the increase in the film thickness is noticeable.

As the third magnetic layer 3 satisfying the above magnetic properties, it is possible to use a perpendicularly magnetized film made of material such as TbFe, TbFeCo, DyFe, DyFeCo, TbDyFe, and TbDyFeCo.

The non-magnetic intermediate layer 5 is provided for the purpose of cutting off the exchange coupling between the third magnetic layer 3 and fourth magnetic layer 4. As a material of the non-magnetic intermediate layer 5, it is possible to use a transparent dielectric such as AlN, SiN, AlSiN, and $Ta_2O_3$ or a non-magnetic metal alloy formed of metal such as Al, Ti, Ta and Ni. The film thickness of the non-magnetic intermediate layer 5 is preferably in a range of from 2 nm to 20 nm. If the film thickness of the non-magnetic intermediate layer 5 is less than 2 nm, it is difficult to cut off the exchange coupling between the third magnetic layer 3 and fourth magnetic layer 4. On the other hand, if the film thickness of the non-magnetic intermediate layer 5 is more than 20 nm, since the magnetostatic coupling between the fourth magnetic layer 4 and first magnetic layer 1 becomes weaker, the movement of a domain wall from the rear end of the light beam 6 can not be limited.

The fourth magnetic layer 4 is formed of a perpendicularly magnetized film made of a rare earth and transition metal alloy, and initialized in advance by heating the fourth magnetic layer 4 to the Curie temperature or a higher temperature with the irradiation of the light beam 6 and by applying an external magnetic field to align the magnetization direction. The Curie temperature Tc4 of the fourth magnetic layer 4 is higher than the Curie temperature Tc3 of the third magnetic layer 3, and is preferably set to 380° C. or a lower temperature. When Tc4<Tc3, since the fourth magnetic layer 4 is heated to the Curie temperature or a higher temperature during recording, the magnetization direction is not uniform. It is thus necessary to perform initialization whenever recording is performed. On the other hand, when Tc4>380° C., it is necessary to heat the fourth magnetic layer 4 to 380° or a higher temperature to perform initialization. When the first magnetic layer 1, second magnetic layer 2 and third magnetic layer 3 are heated to 380° C. or a higher temperature, the magnetic properties of the respective magnetic layers deteriorate and the quality of the readout signal also deteriorates.

Moreover, the film thickness of the fourth magnetic layer 4 is preferably in a range of from 10 nm to 100 nm. If the film thickness of the fourth magnetic layer 4 is less than 10 nm, a leakage magnetic field generated from the fourth magnetic layer 4 with an increase in the temperature becomes smaller, and the magnetostatic coupling between the fourth magnetic layer 4 and first magnetic layer 1 becomes weaker. Thus, the movement of a domain wall from the rear end of the light beam 6 can not be limited. On the other hand, if the film thickness of the fourth magnetic layer 4 is more than 100 nm, since the irradiation intensity of the light beam 6 in initializing the fourth magnetic layer 4 is too strong, it is difficult to align the magnetization direction of the fourth magnetic layer 4.

Furthermore, it is preferred that the fourth magnetic layer 4 is not magneto-statically coupled with the first magnetic layer 1 at temperatures in the vicinity of the Curie temperature Tc2 of the second magnetic layer 2, but is magneto-statically coupled with the first magnetic layer 1 at temperatures which are not lower than a predetermined temperature above Tc2. It is preferred that the fourth magnetic layer 4 is a magnetic layer whose magnetization is increased as the temperature rises in the vicinity of the Curie temperature Tc2.

As the fourth magnetic layer 4 satisfying the above magnetic properties, it is possible to use a perpendicularly magnetized film made of material such as TbFe, TbFeCo, DyFe, DyFeCo, TbDyFe, and TbDyFeCo.

The protective film 17 is made of a transparent dielectric such as AlN, SiN, AlSiN and $Ta_2O_3$, or a non-magnetic metal alloy formed of metal such as Al, Ti, Ta and Ni. The protective film 17 is provided for the purpose of preventing oxidation of the rare earth and transition metal alloys used for the first magnetic layer 1, second magnetic layer 2, and third magnetic layer 3, and has a thickness ranging from 5 nm to 60 nm.

Moreover, in this structure, by additionally providing a thermal diffusion metal layer made of Al, AlTa, AlTi, AlCr, AlNi, AlCo, Cu or the like on the protective layer 14, it is possible to improve the thermal properties of the medium. Besides, in some cases, an ultraviolet ray setting resin, a thermosetting resin, or a lubricant layer is formed on the protective layer 17 or the thermal diffusion layer.

Furthermore, for the purpose of achieving low magnetic field recording, it is also possible to layer adjacent to the third magnetic layer 3 a recording auxiliary layer formed of a perpendicularly magnetized film, which is made of, for example, GdFeCo, GdTbFeCo, or GdDyFeCo and has a coercive force smaller than that of the third magnetic layer 3 and a higher Curie temperature than the third magnetic layer 3.

The following description will explain a method of fabricating a magneto-optical disk of the above-mentioned structure and a recording and reproducing method by illustrating some specific examples.

SPECIFIC EXAMPLE 1

(1) Method of Fabricating A Magneto-Optical Disk

The following description will explain a method of fabricating a magneto-optical disk of the above-mentioned structure. First, the optical disk substrate 15 formed of polycarbonate in the shape of a disk with guide grooves of a depth of 100 nm is placed in a sputtering device provided with an Al target, a GdFeCo alloy target, a DyFe alloy target and a TbFeCo alloy target. After evacuating the inside of the sputtering device to $1\times10^{-6}$ Torr, a mixed gas of argon and nitrogen is introduced and power is supplied to the Al target to provide the transparent dielectric protective layer 16 made of AlN in a film thickness of 80 nm on the optical disk substrate 15 under the condition of a gas pressure of $4\times10^{-3}$ Torr.

Next, after evacuating the inside of the sputtering device to $1\times10^{-6}$ Torr again, an argon gas is introduced and power is supplied to the GdFeCo alloy target to provide the first magnetic layer 1 made of $Gd_{0.27}(Fe_{0.90}Co_{0.10})_{0.73}$ in a film thickness of 40 nm on the transparent dielectric protective layer 16 under the condition of a gas pressure of $4\times10^{-3}$ Torr. The first magnetic layer 1 is a perpendicularly magnetized film with a compensation temperature of 140° C. and a Curie temperature of 280° C.

Subsequently, by supplying power to the DyFe alloy target, the second magnetic layer 2 made of $Dy_{0.25}Fe_{0.75}$ is provided in a film thickness of 10 nm on the first magnetic layer 1 under the condition of a gas pressure of $4\times10^{-3}$ Torr. The second magnetic layer 2 is a perpendicularly magnetized film with a compensation temperature of 40° C. and a Curie temperature of 80° C.

Then, by supplying power to the TbFeCo alloy target, the third magnetic layer 3 made of $Tb_{0.27}(Fe_{0.88}CO_{0.12})_{0.73}$ is provided in a film thickness of 30 nm on the second magnetic layer 2 under the condition of a gas pressure of $4\times10^{-3}$ Torr. The third magnetic layer 3 is a perpendicularly magnetized film with a compensation temperature of 160° C. and a Curie temperature of 260° C.

Thereafter, by supplying power to the Al target, the non-magnetic intermediate layer 5 made of Al is provided in a film thickness of 10 nm on the third magnetic layer 3 under the condition of a gas pressure of $4\times10^{-3}$ Torr.

Subsequently, by supplying power to the TbFeCo alloy target, the fourth magnetic layer 4 made of $Tb_{0.23}(Fe_{0.80}Co_{0.20})_{0.77}$ is provided in a film thickness of 30 nm on the non-magnetic intermediate layer 5 under the condition of a gas pressure of $4\times10^{-3}$ Torr. The fourth magnetic layer 4 is a perpendicularly magnetized film with a compensation temperature of 20° C. and a Curie temperature of 300° C.

Next, by introducing a mixed gas of argon and nitrogen and supplying power to the Al target, the protective layer 17 made of AlN is provided in a film thickness of 20 nm on the fourth magnetic layer 4 under the condition of a gas pressure of $4\times10^{-3}$ Torr.

(2) Recording and Reproduction Properties

The above-described magneto-optical disk was evaluated with a magneto-optical pickup using a semiconductor laser with a wavelength of 680 nm under the condition of a linear velocity of 2.5 m/s. The results of the evaluation are as follows.

First, the fourth magnetic layer 4 was initialized by continuously applying a recording magnetic field of −15 kA/m while continuously irradiating a recording and reproduction-use laser at 7.2 mW. Next, a repeated pattern of upward magnetization and downward magnetization corresponding to the directions of the recording magnetic fields was formed in the third magnetic layer 3 by modulating a recording magnetic field at ±15 kA/m while continuously irradiating the recording and reproduction-use laser at 6.4 mW. By changing the modulation frequency of the recording magnetic field, a magnetic domain pattern of a mark length ranging from 0.1 μm to 0.5 μm was recorded. Here, the mark length means that the recording magnetic domains with a length corresponding to the mark length are formed at a pitch two times longer than the mark length.

Figure 7:
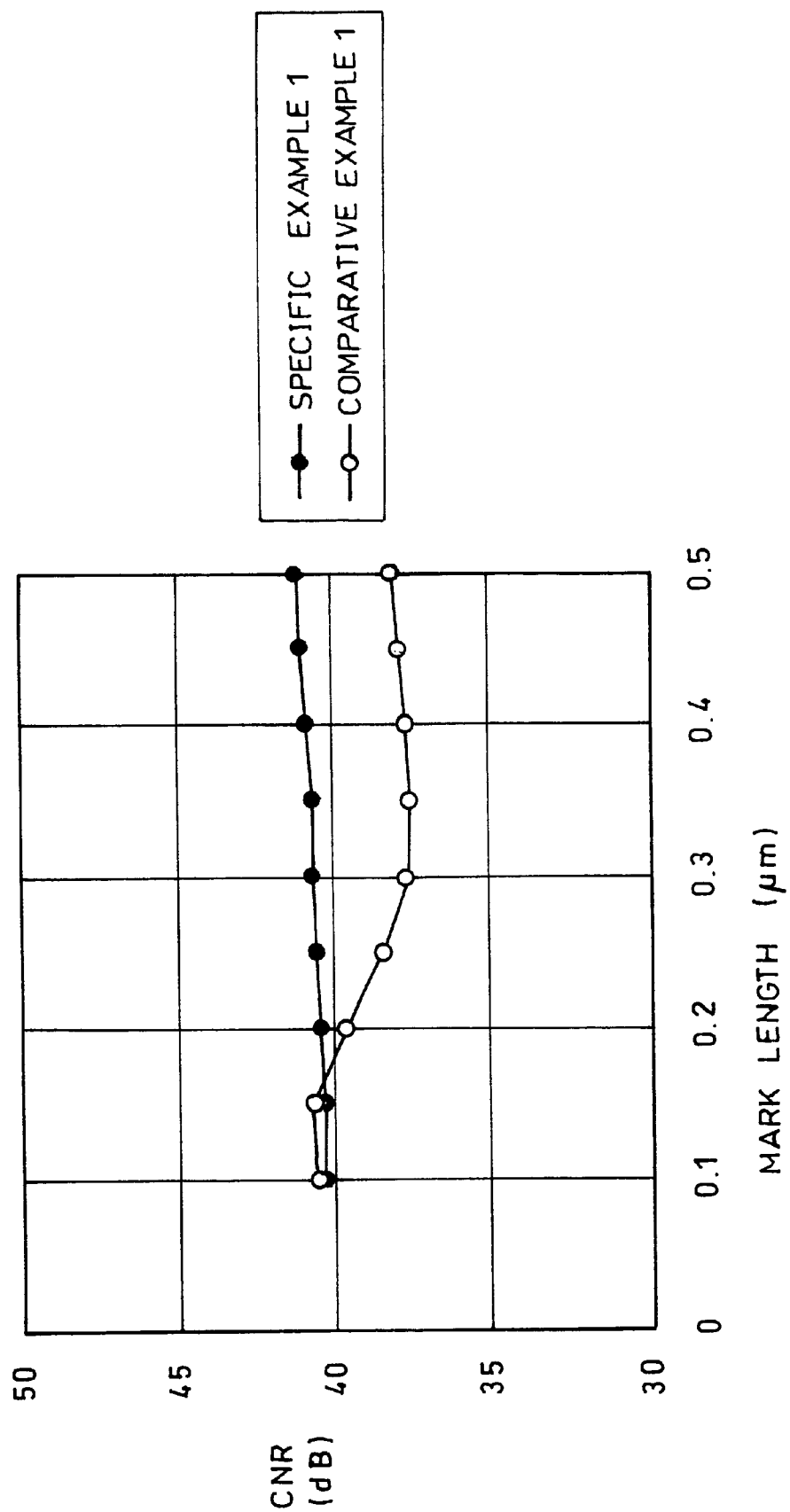
FIG. 7 is a graph showing the dependence of the CNR on the mark length of the magneto-optical disk of the present invention.

Next, the recording and reproduction-use laser was continuously irradiated at 2.4 mW to measure the dependence of the CNR (signal to noise ratio) on the mark length. The result is shown as Specific Example 1 in FIG. 7. Additionally, for comparison purposes, the CNR of a magneto-optical disk having the structure of Specific Example 1 without the non-magnetic intermediate layer 5 and fourth magnetic layer 4 is shown as Comparative Example 1 in FIG. 7.

It was found by comparing Specific Example 1 and Comparative Example 1 that a CNR of 40 dB or more is obtained for both of the examples when the mark length is 0.15 μm or less, but the CNR of Comparative Example 1 is abruptly lowered when the mark length is more than 0.15 μm. In Comparative Example 1, when the mark length is longer, an enlarged magnetic domain obtained by a movement of a domain wall from the rear part and an enlarged magnetic domain obtained by a movement of a domain wall from the front part are read out simultaneously. As a result, readout noise is increased, and the above-mentioned abrupt lowering of the CNR occurs.

On the other hand, in Specific Example 1, the movement of the domain wall from the rear part is stopped in an area having a uniform magnetization direction within a region of the first magnetic layer 1 irradiated with the light beam 6, and an enlarged magnetic domain provided by the movement of the domain wall from the rear part does not enter into the light beam spot. Therefore, even when the mark length is more than 0.15 μm, a lowering of the CNR is not observed at all. Thus, it was confirmed that the magneto-optical recording medium of Specific Example 1 realizes magnetic domain enlargement readout only from the front part and is applicable to mark edge recording.

SPECIFIC EXAMPLE 2

In this specific example, a magneto-optical disk was fabricated according to the magneto-optical recording medium of Specific Example 1 with the only exception that the magnetic properties of the fourth magnetic layer 4 were changed by adjusting the composition thereof, and the recording and reproduction properties of the magneto-optical disk were examined. The CNR was measured by changing the composition and Curie temperature of the fourth magnetic layer 4 for a mark length of 0.1 μm and of 0.3 μm, and the results of the measurements are shown in Table 1. The measurements were carried out by adjusting the readout power so as to obtain a maximum CNR for each disk.

TABLE 1

| Disk | Fourth magnetic layer composition | Compensation temp. (° C.) | Curie temp. (° C.) | CNR (0.1 μm) | CNR (0.3 μm) |
|---|---|---|---|---|---|
| No. 1-1 | $Tb_{0.23}(Fe_{0.63}Co_{0.37})_{0.77}$ | 20 | 400 | 25.2dB | 25.5dB |
| No. 1-2 | $Tb_{0.23}(Fe_{0.66}Co_{0.34})_{0.77}$ | 20 | 380 | 40.3dB | 40.6dB |
| No. 1-3 | $Tb_{0.23}(Fe_{0.73}Co_{0.27})_{0.77}$ | 20 | 345 | 40.4dB | 40.6dB |
| No. 1-4 | $Tb_{0.23}(Fe_{0.80}Co_{0.20})_{0.77}$ | 20 | 300 | 40.3dB | 40.6dB |
| No. 1-5 | $Tb_{0.23}(Fe_{0.84}Co_{0.16})_{0.77}$ | 20 | 275 | 40.2dB | 40.5dB |

TABLE 1-continued

| Disk | Fourth magnetic layer composition | Compensation temp. (° C.) | Curie temp. (° C.) | CNR (0.1 µm) | CNR (0.3 µm) |
|---|---|---|---|---|---|
| No. 1-6 | $Tb_{0.23}(Fe_{0.87}Co_{0.13})_{0.77}$ | 20 | 260 | 40.4dB | 37.9dB |
| No. 1-7 | $Tb_{0.26}(Fe_{0.80}Co_{0.20})_{0.74}$ | 145 | 290 | 40.5dB | 37.6dB |
| No. 1-8 | $Tb_{0.25}(Fe_{0.80}Co_{0.20})_{0.75}$ | 120 | 295 | 40.0dB | 40.2dB |
| No. 1-9 | $Tb_{0.23}(Fe_{0.80}Co_{0.20})_{0.77}$ | 20 | 300 | 40.3dB | 40.6dB |
| No. 1-10 | $Tb_{0.21}(Fe_{0.80}Co_{0.20})_{0.79}$ | −60 | 305 | 40.4dB | 40.7dB |
| No. 1-11 | $Tb_{0.20}(Fe_{0.80}Co_{0.20})_{0.80}$ | −90 | 310 | 6.2dB | 8.4dB |

In disk No. 1-1 through No. 1-6, the compensation temperature was maintained at substantially 20° C. and the Curie temperature was changed by changing the ratio of Fe to Co while maintaining a uniform ratio of the rare earth metal to the transition metal of the fourth magnetic layer 4.

The CNR of disk No. 1-1 was low. The reason for such a lowering of the CNR is as follows. Since the Curie temperature of the fourth magnetic layer 4 is as high as 400° C., the respective magnetic layers were heated to at least 400° C. for the initialization of the fourth magnetic layer 4, and therefore the magnetic properties of the respective layers deteriorated. It was understood from this result that a preferred Curie temperature of the fourth magnetic layer 4 is not higher than 380° C. as mentioned above.

Besides, the CNR of disk No. 1-6 was low. Such a low CNR is caused by the lowering of the Curie temperature of the fourth magnetic layer 4 to 260° C. Namely, in the magneto-optical recording medium of the present invention, it is necessary to heat the third magnetic layer 3 to its Curie temperature or a higher temperature. However, in this specific example, since the Curie temperatures of the third magnetic layer 3 and fourth magnetic layer 4 are both 260° C., the fourth magnetic layer 4 is heated to a temperature equal to or higher than the Curie temperature during recording, and thus the magnetization direction in the fourth magnetic layer 4 is not maintained uniform.

As a result, since a region having a uniform magnetization direction is not produced in the fourth magnetic layer 1 during reproduction, the movement of a domain wall from the rear end of the light beam 6 in the first magnetic layer 1 can not be limited and the CNR is lowered when the mark length is 0.3 µm. It can be understood from this result that it is desirable to satisfy at least a relationship Tc4>Tc3 where TC3 is the Curie temperature of the third magnetic layer 3 and Tc4 is the Curie temperature of the fourth magnetic layer 4.

Next, in disk No. 1-7 through No. 1-11, the compensation temperature was changed by changing the ratio of the rare earth metal to the transition metal contained in the fourth magnetic layer 4 while maintaining a uniform ratio of Fe to Co of the fourth magnetic layer 4.

The CNR of disk No. 1-7 was low. The reason for such a lowering of the CNR is as follows. The compensation temperature of the fourth magnetic layer 4 was as high as 145° C. Therefore, at a readout temperature, a leakage magnetic field produced from the fourth magnetic layer 4 was small, the magnetostatic coupling with the first magnetic layer 1 was weak, and the movement of the domain wall from the rear end of the light beam 6 in the first magnetic layer 1 could not have been sufficiently limited when the mark length was 0.3 µm. It was understood from this result that a preferred compensation temperature of the fourth magnetic layer is not higher than 120° C.

Besides, the CNR of disk No. 1-12 was extremely low. Such a lowering of the CNR occurred because the compensation temperature of the fourth magnetic layer 4 was as low as −90° C., a strong leakage magnetic field is produced from the fourth magnetic layer 4 even at a relatively low temperature. Therefore, during reproduction, the movement of the domain wall in the first magnetic layer 1 was interfered, and magnetic domain enlargement readout could not have been realized. Consequently, The CNR was lowered for both a mark length of 0.3 µm and a mark length of 0.1 µm. It can be understood from this result that a preferred compensation temperature of the fourth magnetic layer 4 is not lower than −60° C.

SPECIFIC EXAMPLE 3

In this specific example, magneto-optical disks were fabricated according to the magneto-optical recording medium of Specific Example 1 with the only exception that the film thickness of the fourth magnetic layer 4 was changed, and the recording and reproduction properties were examined.

Figure 8:
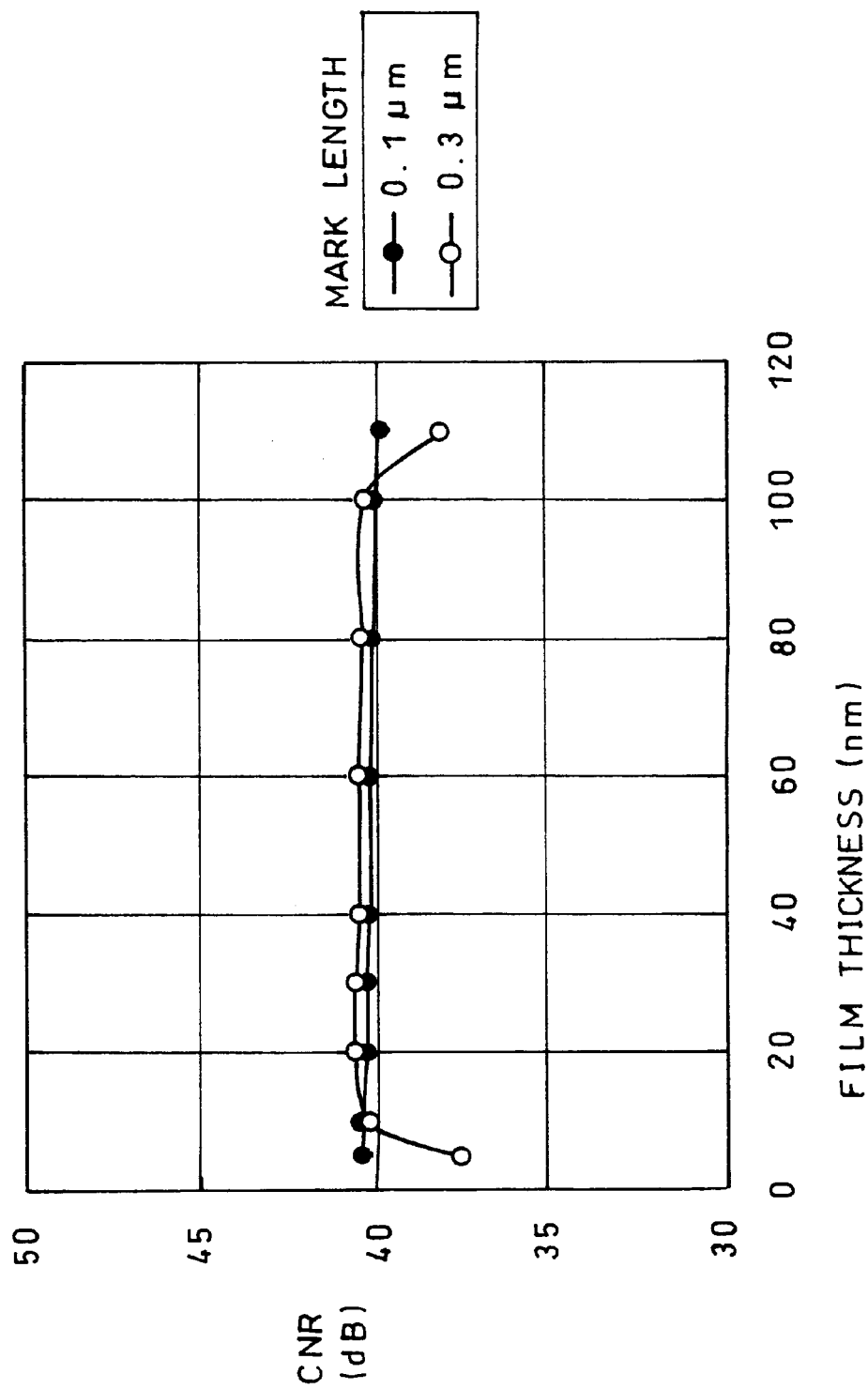
FIG. 8 is a graph showing the dependence of the CNR on the fourth magnetic layer of the magneto-optical disk of the present invention.

FIG. 8 shows the relationship between the CNR and the film thickness of the fourth magnetic layer 4 for a mark length of 0.1 µm and of 0.3 µm. The measurements were carried out by adjusting the readout power so as to obtain a maximum CNR for each disk. It can be understood from FIG. 8 that the CNR was lowered for a mark length of 0.3 µm when the film thickness of the fourth magnetic layer 4 is less than 10 nm and more than 100 nm.

When the film thickness of the fourth magnetic layer 4 is less than 10 nm, since a leakage magnetic field produced from the fourth magnetic layer 4 during reproduction is small and the magnetostatic coupling with the first magnetic layer 1 is weaker, a region 13 with a uniform magnetization direction for limiting the movement of a domain wall can not be formed in the first magnetic layer 1. Therefore, the movement of the domain wall from the rear end of the light beam 6 can not be limited, and an enlarged magnetic domain produced by the movement of the domain wall from the rear end of the light beam 6 and an enlarged magnetic domain produced by the movement of the domain wall from the front end of the light beam 6 were read out simultaneously when the mark length was as long as 0.3 µm. As a result, the readout noise was increased, and the CNR was lowered. Thus, a preferred film thickness of the fourth magnetic layer 4 is not less than 10 nm.

On the other hand, if the film thickness of the fourth magnetic layer 4 is more than 100 nm, even when light of a maximum possible irradiation intensity is irradiated during the initialization of the fourth magnetic layer 4, the fourth magnetic layer 4 is not heated to the Curie temperature or a higher temperature. It is thus difficult to align the magnetization direction in the fourth magnetic layer 4. Hence, a leakage magnetic field generated from the fourth magnetic layer 4 during reproduction became smaller, the magnetostatic coupling between the fourth magnetic layer 4 and first magnetic layer 1 was weaker, and the CNR was lowered. Thus, a preferred film thickness of the fourth magnetic layer 4 is not more than 100 nm.

SPECIFIC EXAMPLE 4

Figure 9:
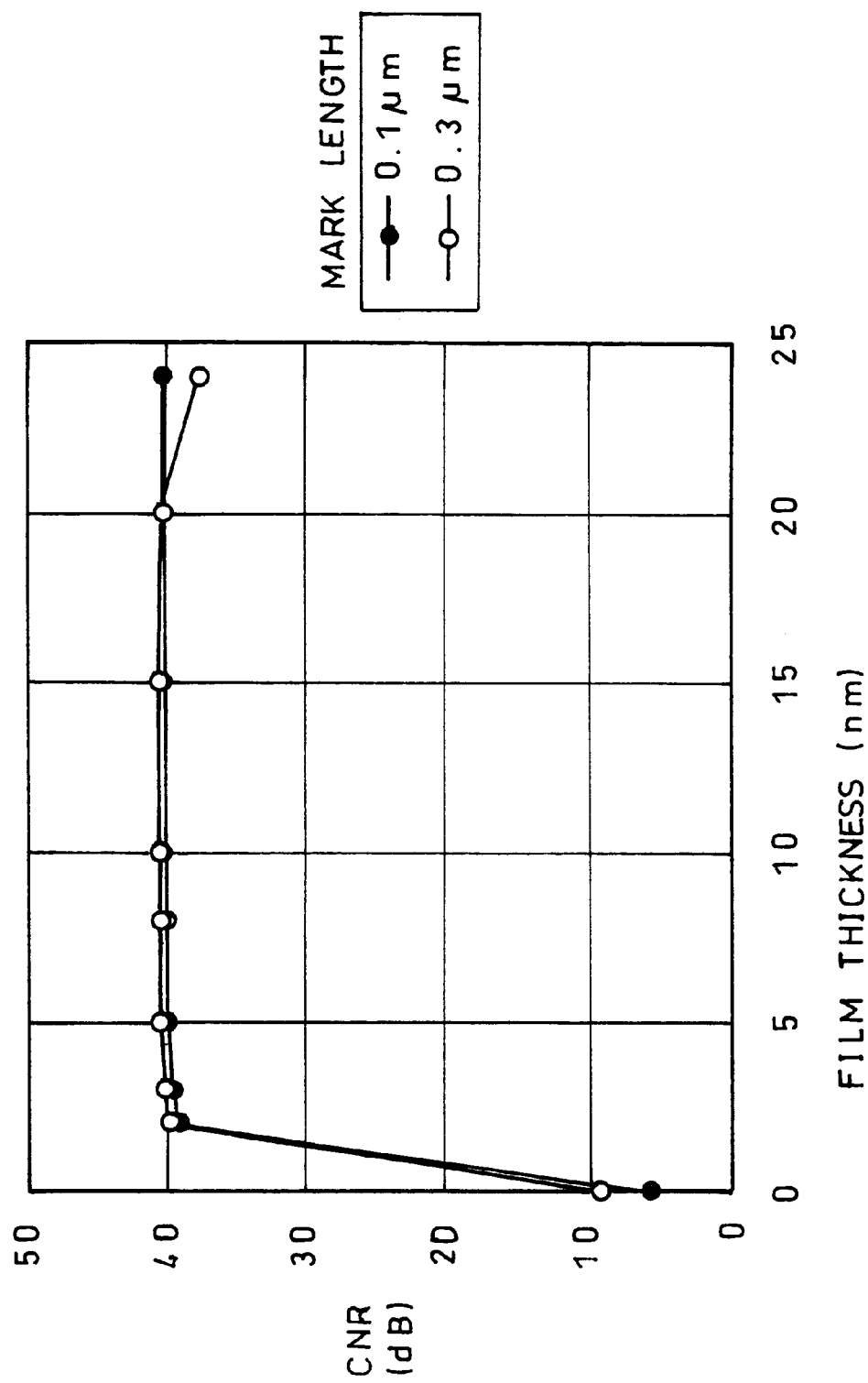
FIG. 9 is a graph showing the dependence of the CNR on the thickness of the non-magnetic intermediate layer of the magneto-optical disk of the present invention.
Figure 10:
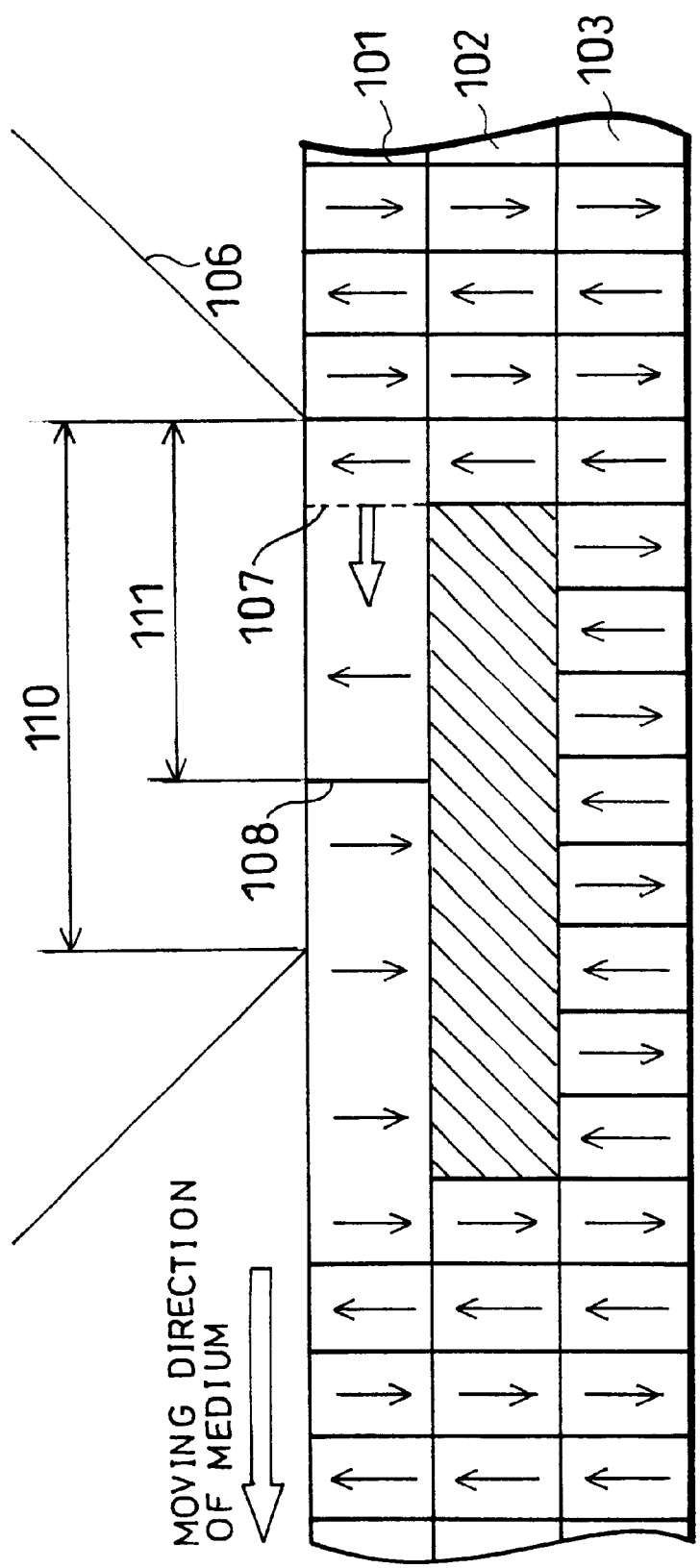
FIG. 10 is a depictive cross section explaining the principle of reproducing information on a conventional magneto-optical disk.

In this specific example, magneto-optical disks were fabricated according to the magneto-optical recording medium of Specific Example 1 with the only exception that the film thickness of the fifth magnetic layer 5 was changed, and the recording and reproduction properties were examined. FIG. 9 shows the relationship between the CNR and the film thickness of the fifth magnetic layer 5 for a mark length of 0.1 μm and of 0.3 μm. The measurements were carried out by adjusting the readout power so as to obtain a maximum CNR for each disk.

It can be understood from FIG. 9 that the CNR was extremely low for a mark length of 0.3 μm and of 0.1 μm when the film thickness of the fifth magnetic layer 5 was less than 2 nm. On the other hand, when the film thickness of the fifth magnetic layer 5 was more than 20 nm, the CNR was extremely low for a mark length of 0.3 μm.

When the film thickness of the fifth magnetic layer 5 was less than 2 nm, since the exchange coupling between the third magnetic layer and fourth magnetic layer 4 was not be cut off, accurate recording on the third magnetic layer 3 was not performed and the CNR was lowered significantly. Thus, the film thickness of the fifth magnetic layer 5 is preferably 2 nm or more.

On the other hand, when the film thickness of the fifth magnetic layer 5 was more than 20 nm, the distance between the first magnetic layer 1 and fourth magnetic layer 4 was increased, the magnetic field produced in the first magnetic layer 1 by the fourth magnetic layer 4 during reproduction became smaller, and therefore the magnetostatic coupling between the fourth magnetic layer 4 and first magnetic layer 1 was weaker. Consequently, the movement of the domain wall from the rear end of the light beam 6 could not have been limited, and the CNR was lowered when the mark length was as long as 0.3 μm. Thus, the film thickness of the fifth magnetic layer 5 is preferably 20 nm or less.

SPECIFIC EXAMPLE 5

In this specific example, magneto-optical disks were fabricated according to the magneto-optical recording medium of Specific Example 1 with the exception that the wall coercivity of the first magnetic layer 1 was changed by adding Dy to GdFeCo of the first magnetic layer 1. By indicating the coercive force at room temperature as the wall coercivity, the relationship between the CNR and the wall coercivity was examined for a mark length of 0.1 μm. As a result, it was confirmed that the CNR of the disk having the first magnetic layer 1 whose wall coercivity is more than 35 kA/m is lowered significantly. Thus, the wall coercivity of the first magnetic layer is preferably 35 kA/m or less.

As described above, the first magneto-optical recording medium of the present invention includes at least a first magnetic layer, a second magnetic layer, a third magnetic layer, a non-magnetic intermediate layer and a fourth magnetic layer which are layered in this order, the first magnetic layer being formed of a perpendicularly magnetized film having a relatively small wall coercivity and a relatively large wall mobility compared with the third magnetic layer in the vicinity of a predetermined temperature, the second magnetic layer being formed of a magnetic film whose Curie temperature is lower than the Curie temperatures of the first magnetic layer and third magnetic layer, the fourth magnetic layer being a perpendicularly magnetized film with a uniform magnetization direction and forming a region with a uniform magnetization direction in the first magnetic layer by magnetostatic coupling with the first magnetic layer when the second magnetic layer is heated to a predetermined temperature or a higher temperature.

According to the above magneto-optical recording medium (and reproducing method), magnetic domain enlargement readout is realized without repetitious readout, and the signals of a cycle less than the diffraction limit of light is readable, thereby significantly improving the recording density.

The second magneto-optical recording medium of the present invention has the structure of the first magneto-optical recording medium, and is characterized by satisfying a condition $$Tc3 < Tc4 \leq 380° \text{ C.}$$

where Tc3 is the Curie temperature of the third magnetic layer and Tc4 is the Curie temperature of the fourth magnetic layer.

This structure has the fourth magnetic layer whose Curie temperature can most effectively limit the movement of a domain wall from the rear end of a light beam, in accordance with the structure of the first magneto-optical recording medium. Therefore, by setting the Curie temperature of the fourth magnetic layer within the above-mentioned range, it is possible to provide the best CNR and improve the recording density significantly.

The third magneto-optical recording medium of the present invention is based on the first magneto-optical recording medium, and characterized by satisfying a condition $$-60° \text{ C.} \leq Tcomp4 \leq 120° \text{ C.}$$

where Tcomp4 is the compensation temperature of the fourth magnetic layer.

This structure includes the fourth magnetic layer whose Curie temperature can most effectively limit the movement of a domain wall from the rear end of a light beam, in accordance with the structure of the first magneto-optical recording medium. Therefore, by setting the Curie temperature of the fourth magnetic layer within the above-mentioned range, it is possible to provide the best CNR and improve the recording density significantly.

The fourth magneto-optical recording medium of the present invention is based on the first magneto-optical recording medium, and characterized in that the wall coercivity of the first magnetic layer is 35 kA/m or less. This structure includes the first magnetic layer with a wall coercivity capable of effectively moving the domain wall from the front end of the light beam. Therefore, by setting the wall coercivity of the first magnetic layer within the above-mentioned range, it is possible to provide a high CNR even when the cycle of the signals is not higher than the diffraction limit of light.

A reproducing device for reproducing information from any one of the above-described first through third magneto-optical recording media of the present invention is characterized by including:

irradiating means for irradiating a light beam on the magneto-optical recording medium during reproduction; and control means for controlling an irradiation intensity of the light beam to an intensity capable of heating the fourth magnetic layer of the magneto-optical recording medium to a temperature at which magnetostatic coupling between the fourth magnetic layer and the first magnetic layer is achieved or a higher temperature.

In other words, the reproducing device of the present invention heats the magneto-optical recording medium to a predetermined temperature (readout temperature) or a higher temperature by irradiation of the light beam from the irradiating means, and controls the light beam, which has been controlled to have an intensity capable of generating a leakage magnetic field sufficient for magnetostatic coupling between the fourth magnetic layer and first magnetic layer, to be irradiated on the magneto-optical recording medium by the control means. Therefore, with the use of this reproducing device, it is possible to satisfactorily reproduce the information on the magneto-optical recording medium including the above-described fourth magnetic layer.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording medium comprising at least a first magnetic layer, a second magnetic layer, a third magnetic layer, a non-magnetic intermediate layer and a fourth magnetic layer which are layered in this order, the first magnetic layer being formed of a perpendicularly magnetized film having a relatively small wall coercivity and a relatively large wall mobility compared with the third magnetic layer in vicinity of a predetermined temperature, the second magnetic layer being formed of a magnetic film whose Curie temperature is lower than Curie temperature of the first magnetic layer and the third magnetic layer, the non-magnetic layer cutting-off exchange coupling between the third magnetic layer and the fourth magnetic layer, and the fourth magnetic layer being a perpendicularly magnetized film with a uniform magnetization direction and forming a region having uniform magnetization direction in the first magnetic layer by magnetostatic coupling with the first magnetic layer when the second magnetic layer is heated to a predetermined temperature or a higher temperature.

2. The magneto-optical recording medium as set forth in claim 1, wherein the magneto-optical recording medium satisfies a condition $$Tc3<Tc4$$

where Tc3 is the Curie temperature of the third magnetic layer and Tc4 is the Curie temperature of the fourth magnetic layer.

3. The magneto-optical recording medium as set forth in claim 2, wherein the Curie temperature Tc4 of the fourth magnetic layer satisfies a condition $$Tc4 \leq 380° C.$$

4. The magneto-optical recording medium as set forth in claim 1, wherein the fourth magnetic layer has a film thickness ranging from 10 nm to 100 nm.

5. The magneto-optical recording medium as set forth in claim 1, wherein the fourth magnetic layer is a magnetic layer whose magnetization is increased with a rise in temperature in vicinity of the Curie temperature of the second magnetic layer.

6. The magneto-optical recording medium as set forth in claim 1, wherein the fourth magnetic layer is a perpendicularly magnetized film made of a material selected from the group consisting of TbFe, TbFeCo, DyFe, DyFeCo, TbDyFe, and TbDyFeCo.

7. The magneto-optical recording medium as set forth in claim 1, further comprising a recording auxiliary layer made of a perpendicularly magnetized film having a smaller coercive force and a higher Curie temperature than the third magnetic layer, the recording auxiliary layer being provided adjacent to the third magnetic layer.

8. The magneto-optical recording medium as set forth in claim 1, wherein the fourth magnetic layer satisfies a condition $$-60° C. \leq Tcomp4 \leq 120° C.$$

where Tcomp4 is a compensation temperature of the fourth magnetic layer.

9. The magneto-optical recording medium as set forth in claim 1, wherein the wall coercivity of the first magnetic layer is not more than 35 kA/m.

10. The magneto-optical recording medium as set forth in claim 1, wherein the non-magnetic intermediate layer provided between the third magnetic layer and the fourth magnetic layer is made of a non-magnetic metal alloy which cuts off exchange coupling between the third magnetic layer and the fourth magnetic layer.

11. The magneto-optical recording medium as set forth in claim 10, wherein the non-magnetic metal alloy is made of a material selected from the group consisting of AlN, SiN, AlSiN, $Ta_2O_3$, Al, Ti, Ta, and Ni.

12. The magneto-optical recording medium as set forth in claim 10, wherein the non-magnetic intermediate layer has a film thickness ranging from 2 nm to 20 nm.

13. The magneto-optical recording medium as set forth in claim 1, wherein the Curie temperature of the second magnetic layer is within a range of from 40° C. to 220° C.

14. The magneto-optical recording medium as set forth in claim 1, wherein the Curie temperature of the first magnetic layer is not lower than 140° C.

15. The magneto-optical recording medium as set forth in claim 1, wherein the first magnetic layer has a film thickness ranging from 20 nm to 80 nm.

16. The magneto-optical recording medium as set forth in claim 1, wherein the Curie temperature of the third magnetic layer is within a range of from 180° C. to 300° C.

17. The magneto-optical recording medium as set forth in claim 1, wherein the third magnetic layer has a film thickness ranging from 5 nm to 80 nm.

18. A reproducing device for reproducing information from a magneto-optical recording medium including at least a first magnetic layer, a second magnetic layer, a third magnetic layer, a non-magnetic intermediate layer and a fourth magnetic layer which are layered in this order, the first magnetic layer being formed of a perpendicularly magnetized film having a relatively small wall coercivity and a relatively large wall mobility compared with the third magnetic layer in vicinity of a predetermined temperature, the second magnetic layer being formed of a magnetic film whose Curie temperature is lower than Curie temperature of the first magnetic layer and the third magnetic layer, the non-magnetic layer cutting-off exchange coupling between the third magnetic layer and the fourth magnetic layer, and the fourth magnetic layer being a perpendicularly magnetized film with a uniform magnetization direction and forming a region having uniform magnetization direction in the first magnetic layer by magnetostatic coupling with the first magnetic layer when the second magnetic layer is heated to a predetermined temperature or a higher temperature, said reproducing device comprising:

irradiating means for irradiating a light beam on the magneto-optical recording medium during reproduction; and control means for controlling an irradiation intensity of the light beam to an intensity capable of heating the fourth magnetic layer of the magneto-optical recording medium to a temperature at which magnetostatic coupling between the fourth magnetic layer and the first magnetic layer is achieved, or a higher temperature.

19. The reproducing device as set forth in claim 18, wherein the magneto-optical recording medium satisfies a condition $$Tc3 < Tc4 \leq 380° C.$$

where Tc3 is the Curie temperature of the third magnetic layer and Tc4 is the Curie temperature of the fourth magnetic layer.

20. The reproducing device as set forth in claim 18, wherein the magneto-optical recording medium satisfies a condition $$-60° C. \leq Tcomp4 \leq 120° C.$$

where Tcomp4 is a compensation temperature of the fourth magnetic layer.

21. The reproducing device as set forth in claim 18, wherein the wall coercivity of the first magnetic layer of the magneto-optical recording medium is not more than 35 kA/m.

* * * * *